(12) United States Patent
Fishwick

(10) Patent No.: US 11,849,137 B2
(45) Date of Patent: *Dec. 19, 2023

(54) SETTING SELECTION VALUES FOR MOTION ESTIMATION VECTORS BASED ON REMOTE MOTION VECTORS OF INTERPOLATED FRAMES

(71) Applicant: Imagination Technologies Limited, Kings Langley (GB)

(72) Inventor: Steven Fishwick, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,183

(22) Filed: Apr. 12, 2022

(65) Prior Publication Data

US 2022/0248046 A1 Aug. 4, 2022

Related U.S. Application Data

(63) Continuation of application No. 16/883,359, filed on May 26, 2020, now Pat. No. 11,330,286, which is a
(Continued)

(30) Foreign Application Priority Data

Jun. 17, 2014 (GB) ..................................... 1410775

(51) Int. Cl.
*H04N 19/513* (2014.01)
*H04N 19/577* (2014.01)
*H04N 7/01* (2006.01)
*H04N 5/14* (2006.01)
*H04N 19/167* (2014.01)
*H04N 19/172* (2014.01)
*H04N 19/182* (2014.01)

(52) U.S. Cl.
CPC .......... *H04N 19/513* (2014.11); *H04N 5/145* (2013.01); *H04N 7/014* (2013.01); *H04N 19/167* (2014.11);
(Continued)

(58) Field of Classification Search
CPC ...... H04N 19/513; H04N 5/145; H04N 7/014; H04N 19/167; H04N 19/172; H04N 19/182; H04N 19/577
See application file for complete search history.

(56) References Cited

U.S. PATENT DOCUMENTS

2009/0231314 A1* 9/2009 Hanaoka .............. G09G 3/2096
345/84
2009/0279799 A1* 11/2009 Suzuki ................. H04N 19/176
375/240.15
(Continued)

FOREIGN PATENT DOCUMENTS

GB 2265065 A 9/1993
WO 2014/072571 A1 5/2014

OTHER PUBLICATIONS

Han et al., "A Motion Compensated Frame Interpolation Scheme for High-Definition Videos," 14th International Symposium on Wireless Protocol Multimedia Communications, IEEE 2011.

*Primary Examiner* — Fabio S Lima
(74) *Attorney, Agent, or Firm* — Potomac Law Group, PLLC; Vincent M DeLuca

(57) ABSTRACT

A motion estimation technique finds first and second candidate bi-directional motion vectors for a first region of an interpolated frame of video content by performing double ended vector motion estimation on the first region. One of these candidate bi-directional motion vectors is selected, and used to identify a remote region of the interpolated frame. This remote region is located at an off-set location from the first region, and is found based on an endpoint of the selected candidate bi-directional motion vector. A remote motion vector for the remote region of the interpolated frame is obtained, and one or more properties of this remote motion vector are used to bias a selection between the first and second candidate vectors.

20 Claims, 9 Drawing Sheets

Related U.S. Application Data continuation of application No. 16/394,712, filed on Apr. 25, 2019, now Pat. No. 10,701,387, which is a continuation of application No. 14/732,406, filed on Jun. 5, 2015, now Pat. No. 10,321,149.

(52) U.S. Cl.
CPC ......... *H04N 19/172* (2014.11); *H04N 19/182* (2014.11); *H04N 19/577* (2014.11)

(56) References Cited

U.S. PATENT DOCUMENTS

| | | | |
|---|---|---|---|
| 2009/0316044 A1* | 12/2009 | Chen | H04N 5/145 348/E7.003 |
| 2010/0054336 A1* | 3/2010 | Okumura | G09G 3/20 375/E7.125 |
| 2010/0149422 A1* | 6/2010 | Samuelsson | H04N 19/513 348/E5.062 |
| 2010/0271484 A1* | 10/2010 | Fishwick | H04N 5/145 348/169 |
| 2010/0284627 A1* | 11/2010 | Lin | H04N 5/145 382/275 |
| 2011/0001884 A1* | 1/2011 | Iketani | H04N 7/014 348/E5.062 |
| 2012/0162454 A1* | 6/2012 | Park | G06T 1/20 348/208.6 |
| 2013/0170551 A1* | 7/2013 | Liu | H04N 19/61 348/E7.003 |

\* cited by examiner

SETTING SELECTION VALUES FOR MOTION ESTIMATION VECTORS BASED ON REMOTE MOTION VECTORS OF INTERPOLATED FRAMES

BACKGROUND

Many video processing systems require knowledge of way that parts of the image move between one frame and the next. The process of determining the motion is known as motion estimation. A common motion estimator is the block-based type, in which a frame of video is divided into a number of blocks, and for each block a vector is found that represents the motion of the pixels in that block.

Motion estimation commonly uses what may be referred to as single-ended motion vectors. FIG. 1 shows an example block based single-ended motion estimator. An image 100 is divided into a regular array of blocks 105, and motion estimation proceeds for each block in turn.

FIG. 1 shows a moving object 110 at a certain position in one frame of a video sequence, and, superimposed onto the same figure, the same object 115, at its position in the previous frame in the sequence. The image data in block 120 contains a number of pixels representing part of object 110. Motion estimation for block 120 involves searching the previous frame in the sequence to find the area of image data with contents most similar to the contents of block 120. Assuming that the motion estimation performs well, the area 125 is found. It can be seen that area 125 is the same size as block 120, but is not aligned to the grid 105. The position of the area of matching pixels 125, relative to block 120, determines motion vector 130 which reflects the motion of object 110, and is said to be the motion vector of block 120.

Single-ended motion estimation works well in some applications, such as video encoding, since it produces one vector for each block, such as 120, in each frame 100 that is encoded.

Another application for motion estimation is a motion compensated frame rate converter. In this application it is necessary to produce an interpolated frame at an intermediate position between two existing source frames in a video sequence. FIG. 2 shows the single ended motion estimation result from FIG. 1, being used to interpolate image data in a new frame mid-way between two source frames from the original video sequence. Motion estimation for block 120 determines motion vector 130, and pixels for a new area of image 200, positioned at the midpoint of the vector, are derived from the pixels in block 120 and from the pixels in area 125. It should be noted that the interpolated area 200 is not necessarily aligned to the block grid.

FIG. 3 illustrates a problem that arises when using single-ended vectors in a frame rate converter. Objects 300 and 305 are moving at different speeds, giving rise to unequal motion vectors 320 and 325 for the blocks 310 and 315 respectively.

In this example the vectors are converging. Interpolation of a new frame involves the creation of pixel data at positions 330 and 335, the mid-points of the two vectors. Blocks 310 and 315 are adjacent, but the interpolated areas, 330 and 335 are not. This leads to a hole, 340, in the interpolated image. An alternative situation exists where vectors diverge, leading to overlap of interpolated areas. In either case, some effort is required to resolve holes and overlap areas, in order to produce an output image with one value at each pixel position.

FIG. 4 shows an example of double ended motion estimation. When used in the example application of a frame rate converter, this type of motion estimation has the significant advantage of producing exactly one value for each pixel position in the interpolated frame. The frame to be interpolated, 400, is divided into a regular array of blocks, 405, and motion estimation takes place for each block in turn. Motion estimation for block 405 involves searching the previous and next frames in the sequence for areas of image data that are most similar to each other. The search is constrained, in this example, by requiring that the offsets of the areas tested are equal in magnitude and opposite in direction with respect to the position of the block in the interpolated frame. In this example, the best match for the motion of the round object is found between area 410 in the previous frame and area 415 in the next frame, both of which are shown superimposed onto the grid of blocks in the interpolated frame. Note that neither area is necessarily aligned with the grid. The forward offset 420 is equal to the backward offset 425. In combination the two offsets may be said to be the motion vector of block 405, and represent the motion of an object in the interval between source frames. In the figures, where double ended motion vectors are shown, the component corresponding to the forward offset (such as 420) is shown with an open arrow head, and the component corresponding to the backward offset (such as 425) is shown with a solid arrow head.

Interpolation of pixel data in block 405 requires that pixel data be derived from pixel data in one or both of the areas 410 and 415. The alignment of the grid to the interpolated frame means that exactly one value is produced for each pixel position.

The example of FIG. 4 shows interpolation occurring at the temporal mid-point between two source frames. In frame rate conversion it is common that other interpolation phases are required, for example interpolation at one quarter of the interval between source frames. In such a situation several possibilities exist, one of which is illustrated in FIG. 5. A block 500 is motion estimated and interpolated using a method similar to that illustrated in FIG. 4. However, it is known that interpolation at one quarter of the frame interval is required, and so the forward offset 505 is scaled such that it is three times the size of the backward offset 510. The scaled offsets are then used in motion estimation and interpolation. This gives correct interpolation position of object 515 at one quarter of the temporal interval between source frames. Should further interpolations be required, for example at half and three-quarter intervals, further motion estimations are performed with forward and backward offset sizes adjusted accordingly.

Occluded and revealed areas of images present a problem for any motion estimation system, and particularly for a system using double-ended vectors. A common example occurs where an object moves across a background. At the leading edge of the moving object parts of the background are occluded, and at the trailing edge of the moving object parts of the background are revealed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A motion estimation technique is described for determining the quality of a double ended motion vector for a particular block of a frame or image. For example, when the motion detection rules used to determine the best matching motion vector identify more than one good match, one of the candidate vectors needs to be picked. This is achieved by using vectors located at the endpoints of one of the candidate vectors to determine the quality of the candidate vector.

In an example, first and second candidate bi-directional motion vectors are found for a first region of an interpolated frame by performing double ended vector motion estimation on the first region. One of these candidate bi-directional motion vectors is selected, and used to identify a remote region of the interpolated frame. This remote region is located at an off-set location from the first region, and is found based on an endpoint of the selected candidate bi-directional motion vector. A remote motion vector for the remote region of the interpolated frame is obtained, and one or more properties of this remote motion vector are used to bias a selection between the first and second candidate vectors.

According to one aspect there is provided a motion estimation method comprising: computing at least first and second candidate bi-directional motion vectors for a first region of an interpolated frame by performing double ended vector motion estimation on the first region; selecting one of the candidate bi-directional motion vectors; identifying a remote region of the interpolated frame, the remote region being located at an off-set location from the first region, based on an endpoint of the selected candidate bi-directional motion vector; obtaining a remote motion vector for the remote region of the interpolated frame; and biasing a selection between the first and second candidate vectors based on one or more properties associated with the remote motion vector. By mapping information obtained in relation to offset locations on to the region being investigated it is possible to distinguish between candidate motion vectors and avoid artefacts.

The properties associated with the remote motion vector may include the magnitude of the remote motion vector; the direction of the remote motion vector; and a pixel match value relating to the similarity between a set of pixels located at each end of the remote motion vector. The biasing may include comparing one or more properties associated with the remote motion vector with one or more properties associated with the selected candidate bi-directional motion vector and/or a predetermined value.

Examples may further comprise selecting a further remote region of the interpolated frame, the further remote region being located at an off-set location from the first region and remote region, based on the other endpoint of the selected candidate bi-directional motion vector; obtaining a further remote motion vector for the further remote region of the interpolated frame; and further biasing the selection between the first and second candidate vectors based on one or more properties associated with the further remote motion vector. By using the information from two remote offset regions it is possible to further distinguish between cases in which a selected candidate vector is incorrect, and cases in which the problem is occurring elsewhere in the scene.

In general, for examples that use two remote offset regions, if both remote vectors are similar to the candidate block vector used to identify these offset regions, and both represent a good pixel match, then that candidate block vector is may be trustworthy, and the choice of candidate vectors can be biased towards that candidate. If only one of the remote vectors is different to the candidate vector used to identify the offset regions, or provides a poor pixel match, then this is possibly caused by an occlusion problem elsewhere, and there may be no issue with the candidate block vector; biasing may be selected accordingly. If both of the remote vectors are either different to the candidate vector used to identify the remote regions, or both have a poor pixel match/SAD, then the candidate vector may be flagged as risky, and an appropriate bias applied away from the candidate vector.

In another aspect, there is provided a method for interpolating by motion estimation one or more frames of video data from two or more adjacent frames of video data using the described motion estimation method.

In another aspect, there is provided a motion estimator comprising a processor configured to perform the described method.

In another aspect, there is provided a motion estimator, comprising: a storage device; candidate vector identification logic arranged to compute at least first and second candidate bi-directional motion vectors for a first region of an interpolated frame by performing double ended vector motion estimation on the first region, and store the candidate bi-directional motion vectors in the storage device; remote region selection logic arranged to select one of the candidate bi-directional motion vectors from the storage device and identify a remote region of the interpolated frame, the remote region being located at an off-set location from the first region, based on an endpoint of the selected candidate bi-directional motion vector; remote vector determination logic arranged to obtain a remote motion vector for the remote region of the interpolated frame; and vector biasing logic arranged to bias a selection between the first and second candidate vectors based on one or more properties associated with the remote motion vector.

In another aspect, there is provided computer readable code adapted to perform the steps of the described method when the code is run on a computer. A computer readable storage medium may be provided having encoded thereon the computer readable code. In another aspect, there is provided computer readable code for generating a processing unit comprising the described motion estimator. A computer readable storage medium may be provided having encoded thereon computer readable code for generating a processing unit comprising the described motion estimator.

The above features may be combined as appropriate, as would be apparent to a skilled person, and may be combined with any of the aspects of the examples described herein.

BRIEF DESCRIPTION OF THE FIGURES

Examples will now be described with reference to the accompanying figures in which.

Figure 1:
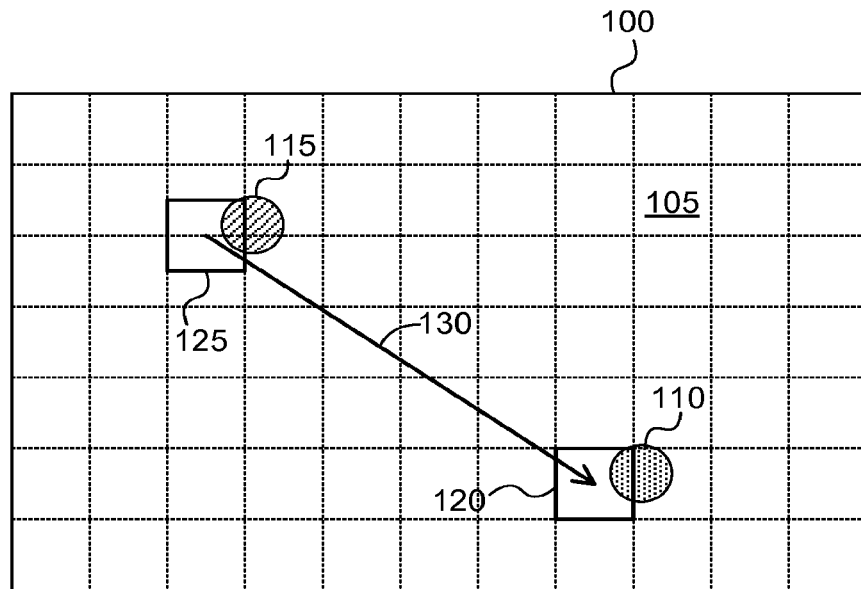
FIG. 1 shows an example of a single ended vector for motion estimation.
Figure 2:
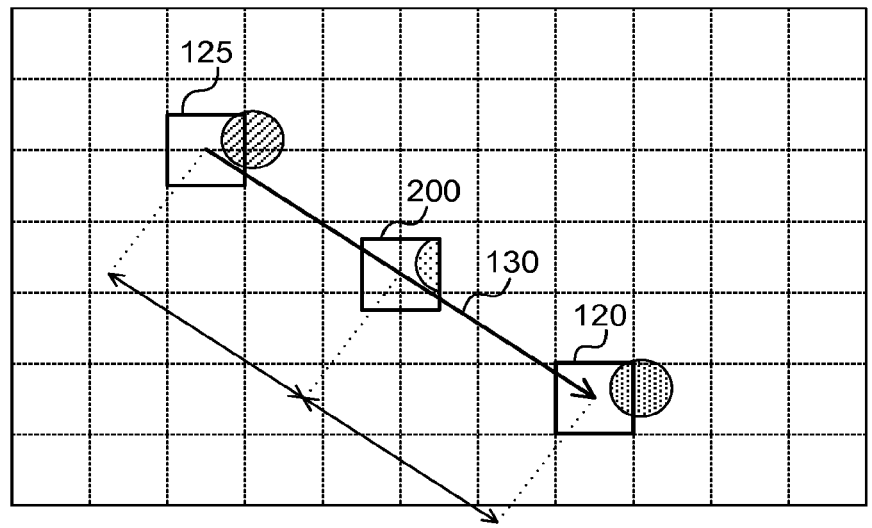
FIG. 2 shows an example of interpolation performed using the single ended vector of FIG. 1.
Figure 3:
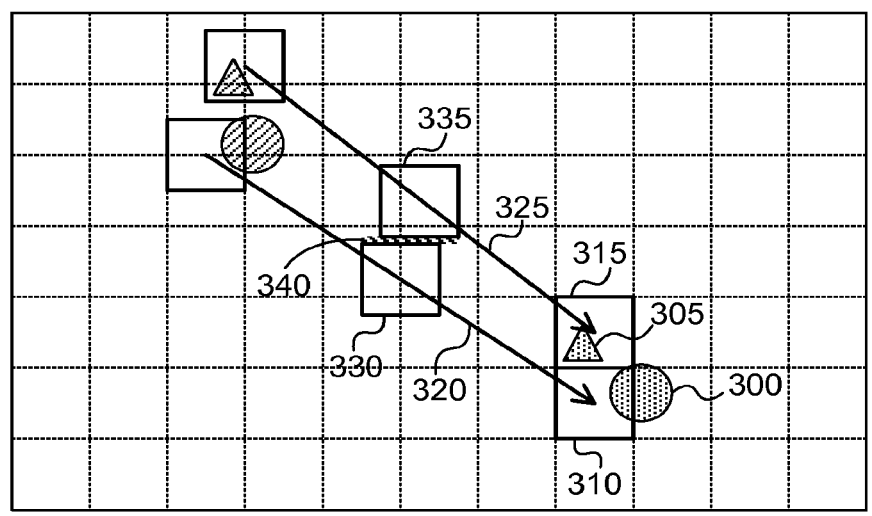
FIG. 3 shows two examples of single ended vectors indicating issues that can be caused by their use in motion estimation.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

Figure 6:
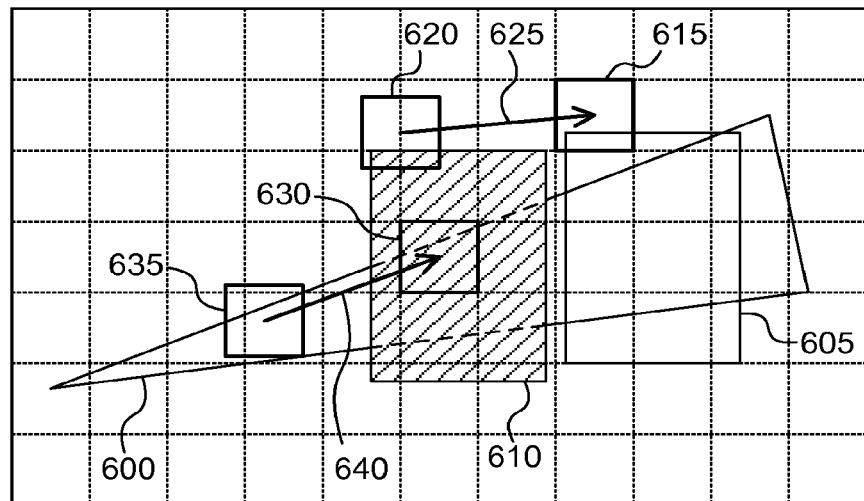
FIG. 6 shows an example of occlusion when using single ended vectors.

FIG. 6 shows a simple example of a revealed area in a single-ended motion estimator. The background of the scene is static and contains object 600. Object 605 is in the foreground and is moving from left to right. In the previous frame of the sequence, the object 605 was in the position shown by the shaded rectangle 610. Motion estimation for block 615 is straightforward. The contents of the block are found in area 620 of the previous frame, and so motion vector 625 is assigned to block 615. Motion estimation for block 630 is complicated by the fact that the background in this area has just been revealed by the motion of object 605. In the current frame, the pixel data for block 630 contains part of the upper edge of triangle 600. The background, including object 600, is not moving, and so it is clear that block 630 should be assigned a zero vector. However, in the previous frame, the area of pixels co-located with block 630 contains the image of moving object 610. The zero vector comparing these areas of pixels provides a poor pixel match and is unlikely to be selected. In general, the vectors assigned in an occluded or revealed area contain an assortment of next-best matches. In FIG. 6, block 630 has found a next-best match in the contents of area 635, an area of background that is not occluded in the previous frame. Consequently, vector 640 has been selected which is not representative of the true motion of the objects in the scene.

It is important to appreciate that although a motion vector may be considered "correct" in that it accurately describes the true motion in the scene or "incorrect" in that it does not accurately describe the true motion in the scene, many motion estimators do not have such a concept as this cannot be readily understood by a machine in the way that it can to a human. Instead, the motion estimators are looking for a "good" pixel match. Therefore, in the above example, vector 640 is considered to be a "good" vector as it has a good pixel match, even though it would be considered incorrect as far as the true motion is concerned.

Figure 7:
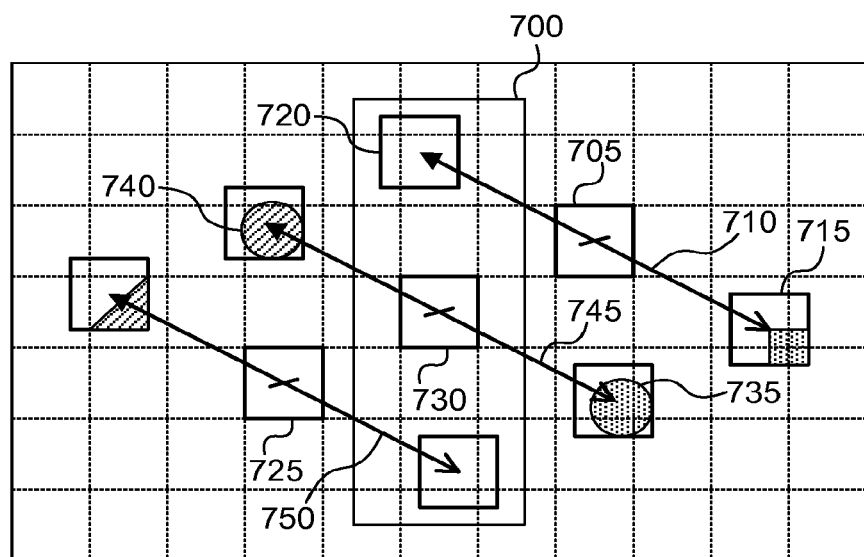
FIG. 7 shows an example of occlusion when using double ended vectors.

FIG. 7 shows examples of occlusion problems that are specific to systems using double ended vectors. The scene consists of a foreground object 700 which is not moving. The background is moving uniformly from top left to bottom right, with motion that would be correctly described by vector 710. Ideally, motion estimation for block 705 would select vector 710, since block 705 is part of the background. However, in order to select this vector, the motion estimator would be required to find a good match between the areas of pixel data at 715 and 720. This match cannot be found, because the background is occluded by object 700 in area 720. As a result the motion estimator is unlikely to select vector 710, but some other vector that provides a good pixel match, but which does not reflect the true motion of the image. A very similar situation can be seen to exist for block 725. For this reason it is likely that the motion vector field produced by a double ended motion estimator will contain regions of bad vectors in the areas adjacent to an occluding object.

When performing motion estimation with double ended vectors, the search for areas of image data that are most similar to each other is subject to a set of rules aimed at identifying the best vector match. As mentioned above, these motion estimation rules may constrain the offsets of the areas tested to be equal in magnitude and opposite in direction with respect to the position of the block in the interpolated frame. The motion estimation rules may further require a comparison of the degree of pixel matching of the offset areas, among other restraints and requirements. Suitable motion estimation rules for identifying the best vector matches when performing double ended vector motion estimation are known and will not be described in particular detail.

Typically the motion estimation rules will apply a particular weighting or bias to a set of potential vectors to identify the vector that best fulfils the requirements stipulated by the rules. However, in some situations there can be more than one good match, meaning that the motion estimator still needs to select between more than one potential vector considered "good" according to the motion estimation rules.

Motion estimators may find more than one good match for a number of reasons. In one example, a region of the screen, other than the true motion, just happens to give a good pixel match. This commonly happens in featureless regions (e.g. most sections of a blue sky look the same as other section if you cannot see the horizon or clouds as a point of reference) or aliasing cases (e.g. most bricks in a wall look a lot like the other bricks if you cannot see the edges of the building for reference). In these cases there is usually a correct or true motion vector that could be found if the true motion vector can be distinguished from the aliases.

A second example is the occlusion situation described above, which is a situation that the human brain can resolve most of the time but is complex to achieve in a machine. In this example there are multiple good matches and those matches may all be correct/true motions rather than aliases. In this situation there isn't an "incorrect" answer as both motions are correct and represent true motion. In other words, more than one vector is correct and represents true motion, but it is unknown which object is in the foreground.

One example of such a situation is illustrated in FIG. 7, where a single motion vector for block 730 cannot be determined with confidence. The moving object, 735 in the next frame, and 740 in the previous frame, suggests the motion vector 745. The motion estimator, having determined that a similar vector is appropriate in the background areas of the image may strongly favour this choice. Selection of vector 745 would result in object 735 being interpolated in block 730. Alternatively, since object 700 is not moving, a zero vector might be selected for block 730. In this case, object 735 would not be interpolated in the block. It is not clear which solution is correct, as there are two candidate vectors, the non-zero vector 745 and the zero vector and both represent the true motion of different objects passing through block 730. Object 735 may be part of the background, passing behind object 700, or it may be a foreground object, passing in front of object 700. In general it is difficult to reliably make the correct vector selection without an understanding of the structure of the scene which conventional motion estimators are unlikely to possess.

In such situations, where there are two or more potential motion vectors that are consistent with the motion estimation rules, the system will not know which motion vector to apply. This can result in either a background object being incorrectly shown in front of a foreground object or toggling between the motion vectors may result in flickering of the image as an object appears behind another object in one frame, and in front in the next frame.

The difficulty in such a situation as this is that the potential motion vectors may all have very good pixel matches, they may be entirely consistent with the vectors around them and be surrounded by vectors with no problems at all. Essentially there is no way of seeing that there is a problem with any of the potential motion vectors by looking at that vector or the local area. The fact that there is more than one good motion vector may be considered an indication that something strange is happening in this region but this information alone is insufficient to distinguish the issue of multiple true motion vectors from a common case where scenes find lots of good matches in regions with little detail or contain repeating patterns.

In other words, it can be observed that situations arise where more than one good vector is found, every locally surrounding vector is also good and biases towards the choice of one vector but that vector is the wrong one. The technique described below identifies this case by looking at an offset location—possibly offset by, e.g., hundreds of pixels from the current block where the multiple vectors were found.

Figure 8:
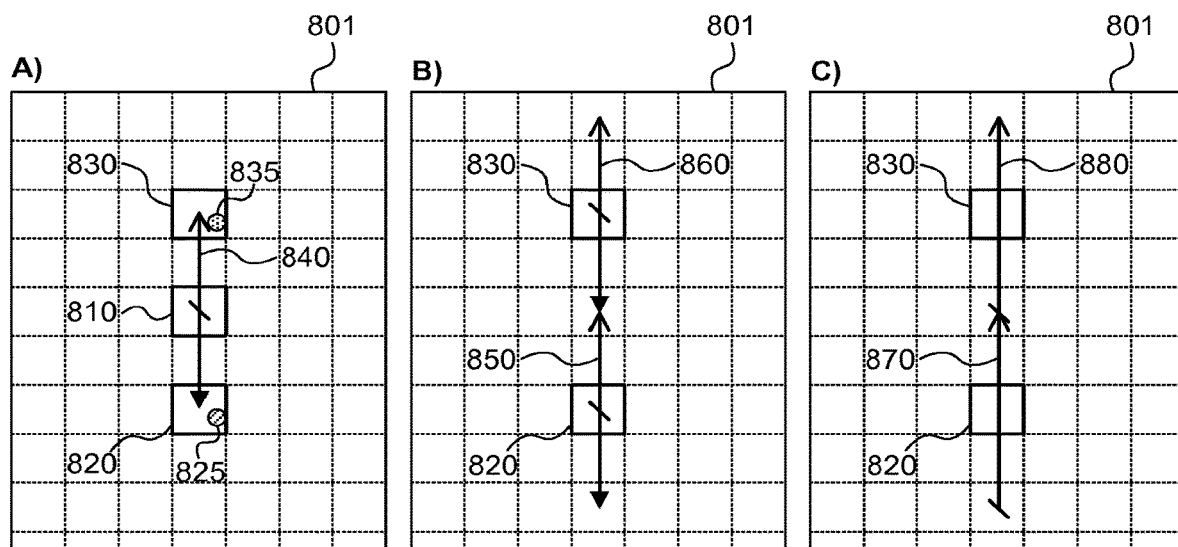
FIG. 8 shows a set of example vectors that may be used in the absence of an occluding object.

FIG. 8 shows three examples, labelled A), B) and C). Generally, in FIG. 8, an interpolated frame 801 has an image space which is divided into a plurality of regions. In this example, the regions are in the form of a grid of blocks, but in other examples the regions can be of any suitable shape. Double ended vector motion estimation is to be performed in relation to a first region, which corresponds to grid block 810 in this example. The scene to which motion estimation is being applied includes objects that are generally moving from the bottom to the top of the frame. In particular, lower block 820 represents the position of an object, or part of an object, 825 in a first frame, and upper block 830 represents the position of the same object portion 835 in a second frame. The interpolated frame 801 is to be an interpolation between the first frame and the second frame.

As noted above, the general principle of double ended vector motion estimation is to select a candidate region, such as block 810, on which motion estimation is to be performed, and to apply a set of rules to determine a bi-directional vector that best matches the rules in relation to other potential vectors. Specifically the aim is to identify the vector that most accurately reflects the movement of pixels through the selected block. The best match, or matches, provided by the rules are termed, in this description, the candidate vectors. There may be only a single candidate vector, or there may be multiple candidate vectors that need to be chosen between in order to avoid artefacts. The general process of double ended vector motion estimation is then repeated for each block of a given frame until the entire frame has been processed.

In the absence of any occlusions caused by background or foreground objects the bi-directional motion vector 840 may be selected as indicated in example A).

Figure 9:
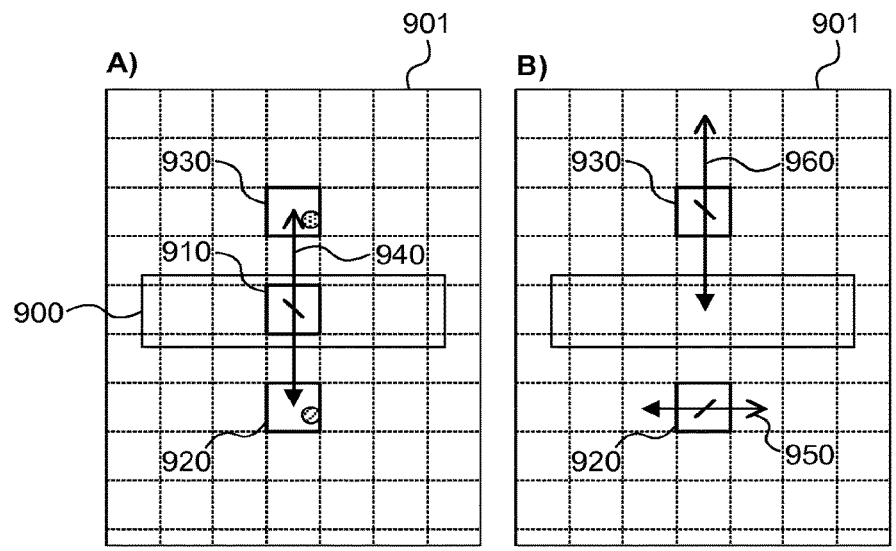
FIG. 9 shows a set of example vectors that may be used in the presence of an occluding object.

FIG. 9 shows two examples, labelled A) and B), matching the scene previously shown in FIG. 8, modified only by the addition of a stationary foreground object 900 to form frame 901. In this case, when looking for candidate vectors in block 910, vector 940 may be selected as it still provides a good pixel match for the background in regions 920 and 930 of an earlier and later frame respectively. This vector has the same magnitude and direction as vector 840 from example A) in FIG. 8 which was determined in the absence of the foreground object 900 and provides an equally good pixel match in both examples.

However, the presence of stationary object 900 in FIG. 9 means block 910 will also have at least one additional vector that provides a good pixel match—the zero motion vector describing the motion of object 900 between the two frames. It is important to note that both vectors provide a good pixel match for the objects they are tracking and both accurately identify the true motion of objects passing through block location 910. For some applications it is preferable to consistently select the motion vector of the foreground object in preference to the motion vector for any background objects. One example application where identifying and storing the foreground motion vector in preference to any background motion vectors is a motion compensated frame rate converter. Interpolating using a vector describing the motion of objects in the background results in those background objects being displayed in front of foreground objects in a scene—an unacceptable result. Alternatively, allowing the system to arbitrarily pick between multiple good match vectors with no bias towards foreground (or background) vectors can result in the motion vectors assigned to a block toggling between multiple good match vectors. The interpolation of that block location will similarly toggle between the multiple objects described by the good match vectors—giving rise to highly distracting flickering interpolation artefacts.

In order to resolve this issue, information is determined by investigating motion vectors associated with one or more offset locations from the current block 820. The information determined from these offset locations is then used to determine which of the possible good candidate vectors describes the motion of the foreground object, and to bias the selection of one of the candidate vectors towards the foreground vector.

Starting with example A) of FIG. 8, the candidate motion vectors for block 810 are determined. The only good candidate, according to the motion estimation selection rules, may be candidate 840, which is selected as the bi-directional motion vector for that block. The remotely located blocks 820 and 830 are identified and selected by determining the blocks to which candidate vector 840 is pointing, which may use an appropriate rounding method. Various methods exist for determining which block or blocks a vector endpoint point falls within. The following examples provide illustrative examples but any other suitable techniques could also be used. Typically, a base point is assigned in the current block (e.g. block 810) which may be the centre point of the block or one of the corners of that block. An offset from that base point is derived from the motion vector to be evaluated (e.g. vector 840) to give an endpoint location. The remotely located block that the endpoint lies in may be simply determined by evaluating that endpoint location against the remotely located block edges. In cases where the endpoint lies on or in close proximity to one or more shared block edges it may be necessary to consider that endpoint as ending in all of the blocks adjacent to the shared block edges or to apply a simple rule for selecting which of the blocks the endpoint should be considered to end in. Examples include round toward the base point, round away from the base point and conventional maths rounding schemes. Similarly more than one remotely located block may be identified if the endpoint is assigned an area rather than an infinitesimally small size. Typically, the area of endpoint position could be derived from the area of the block, the area of the object being tracked or the uncertainty/precision of the motion vectors used.

Once one or more remotely located blocks (e.g. blocks 820 and 830) are selected, then motion vectors for the identified blocks in the interpolated frame are obtained (as outlined below) and their properties are analysed in order to determine if candidate vector 840 is correct. The motion vectors for the identified blocks may double ended or single ended, or a combination of both.

Example B) shows the case where the resulting remote vectors are double ended vectors 850 and 860. One set of properties associated with the remote double ended vectors 850 and 860 that may be analysed are those of the vectors themselves. Specifically, the magnitude and/or the direction of the remote vectors can be determined and compared with the magnitude and/or direction of the candidate vector 840 to ascertain whether the vectors are the same or different. The closer the match between the vectors, the more likely it is that the selected candidate vector 840 is correct. For example, if the vector 850 and/or 860 is the same at the offset location 820 and/or 830 as the vector 840 for current block 810 then it can be assumed that the objects described by those vectors are moving in the same way. In other words, they are not being perturbed by anything and are therefore likely a well tracked foreground object or a global motion pan caused by something like a camera pan. Although a small amount of variation can be expected because things do not always move by exactly the same amount (e.g. the camera pan may actually be a rotation where the exact angle and distance of the vector is dependent on the distance from the camera to the object being tracked), as the difference between the vectors increases it becomes less certain that the objects are moving in the same way.

Another property associated with the remote double ended vectors 850 and 860 that may be analysed is how similar the contents of the areas of image data pointed to by either end of each vector are to each other. This will be referred to as the pixel match value of the double ended vector, as described above, and can be measured by quantities such as the sum of absolute differences (SAD) or mean square differences (MSD). Several such measures are well known in image recognition and will not be described further here. For example, a higher pixel match value may indicate a better pixel match between the two areas at either end of the vector, and so the higher the probability is that the selected candidate vector 840 is correct. For example, if everything is moving consistently as described above then the vector 850 and/or 860 will not only be the same size and direction as vector 840, but should also have a good pixel match. If it had a poor pixel match but just happened to have the same size and direction as vector 840 then it may be treated with suspicion. This is because otherwise there is an assumption that the vector matching process works because the surrounding area knows exactly where the objects are all moving and it is only the current location that is uncertain. However, if the surrounding area that is being queried is not sure about the movement (e.g. has a poor pixel match) then it should not guide the vector selection.

Example C) shows an example where the resulting vectors are single ended vectors 870 and 880. In this case, the single ended vectors are equivalent to the double ended vectors of example B). That is, the mid-point of the single ended vector lies in the remotely located block. Example C) shows one single ended vector 870 pointing to the block 810, and one single ended vector 880 that originates from the block 810. The properties of the single ended vectors can be analysed in the same way as outlined for example B). It should be noted that single ended vectors can be readily converted to double ended vectors and vice versa, and the analysis performed using either type depending on what vectors are available or the capabilities of the system.

In examples B) and C) the remote vectors (850 and 860 in B) and 870 and 880 in C)) are both similar to the candidate vector 840. The pixel match of these remote vectors may also be good (e.g. having a low SAD or MSD value), further indicating that these remote vectors correctly identify the motion of pixels passing through blocks 820 and 830 respectively. This indicates that the motion in the scene at the blocks covered by vector 840 and in the direction of vector 840 are consistent and that vector 840 is likely the best candidate vector. Therefore, block 810 can be asserted as being safe, relating to a scene with a consistent vector field. Such motion is found during regular panning regions, for example, in which there are no occluding objects.

It should be noted that the checks described for examples B) and C) for FIG. 8 are not strictly necessary since only one candidate vector 840 may have been identified as good by the motion estimation rules, and so there is no risk of flickering between multiple good candidate vectors. However, this check was described as an example, and a further example will be described in relation to examples A) and B) in FIG. 9 where there is a risk of flickering.

In example A) of FIG. 9, as described above, a foreground object 900 is inserted into the scene. Object 900 is static, and does not move between the frames of interest. The motion estimation rules are applied to block 910 to identify the best candidate vectors, and two possible vectors are identified: the non-zero vector 940 being the vector with the same magnitude and direction as vector 840 as identified in example A) of FIG. 8, and the zero vector. Since the method is oblivious to the content of block 910 during the interpolated frame, there is no information available to indicate whether an object found in block 920 in an earlier frame, and in block 930 in a later frame, should pass in front or behind object 900 in the interpolated frame. The existing motion estimation rules may therefore indicate that vector 940 and the zero vectors are equally good choices.

In order to determine which of the good choice motion vectors should be chosen for block 910, the method investigates the properties of regions identified by all of the good candidate vectors. The good non-zero motion vector 940 identifies remote locations 920 and 930 using its vector endpoints. The motion estimation rules, as applied to regions 920 and 930, identify vectors 950 and 960 respectively in example B) of FIG. 9. Vectors 950 and 960 represent examples of vectors that may be chosen as the best fit vectors for remote areas when occlusions occur. The rules are unable to identify the true motion vector for block 920, and therefore a different vector 950 is chosen. Vector 950 has a different magnitude and direction to candidate vector 940 and may have been chosen as it represents the vector having the lowest SAD value. In contrast, for block 930, a similar motion vector 960 has been chosen by the rules, but this vector will be comparing pixels from the foreground object 900 with background pixels usually resulting in a poor pixel match value (e.g. having a high SAD or MSD value).

Vectors 950 and 960 represent the best matches that the motion estimation rules can provide.

After obtaining the best match motion vectors for remote regions 920 and 930 and analysing their associated properties, the method provides a way of determining which candidate vector to select by biasing the choice between candidate vectors associated with region 910 based on the analysis. Some examples may rely on two factors relating to remote motion vectors to a current block. The first is the vectors themselves, and the second is the pixel match properly associated with those vectors. Appropriate action can be taken to bias the choice of a candidate vector based on these properties.

If both remote vectors 950, 960 are bad, due to either differing in magnitude and/or direction from the selected candidate vector or from a poor pixel match, then the candidate motion vector being analysed is "bad" and should not be chosen because it does not accurately represent the motion of pixels passing through block 910. Consequentially a bias is applied against that candidate vector to reduce the likelihood that it will be selected.

If the remote vector associated with one remote region is bad, having a sufficiently different magnitude and/or direction or a low pixel match value, but the other vector is "good", having a sufficiently similar magnitude and/or direction and high pixel match value, then the selected candidate vector can be labelled as risky, but not necessarily so bad that it should not be chosen. This is because an object contained in the regions analysed in respect of the remote vector may simply be partially occluded, or have a lower pixel match value due to common changes between frames such as lighting difference and object distortion (e.g. rotation, scaling, etc). Risky blocks may be penalised but not by an amount more than a block flagged as bad. Similarly, it may be desirable to apply different penalties depending on the nature of why the vector was labelled as risky. It may be considered that vectors labelled as risky due to a low pixel match value at the offset location is not as bad as a significantly different motion vector direction/magnitude at the offset location It should be noted that although the remote vectors analysed in the example of FIG. 9 are double ended vectors, a similar analysis can also be performed using single ended remote vectors, if these are available.

Figure 10:
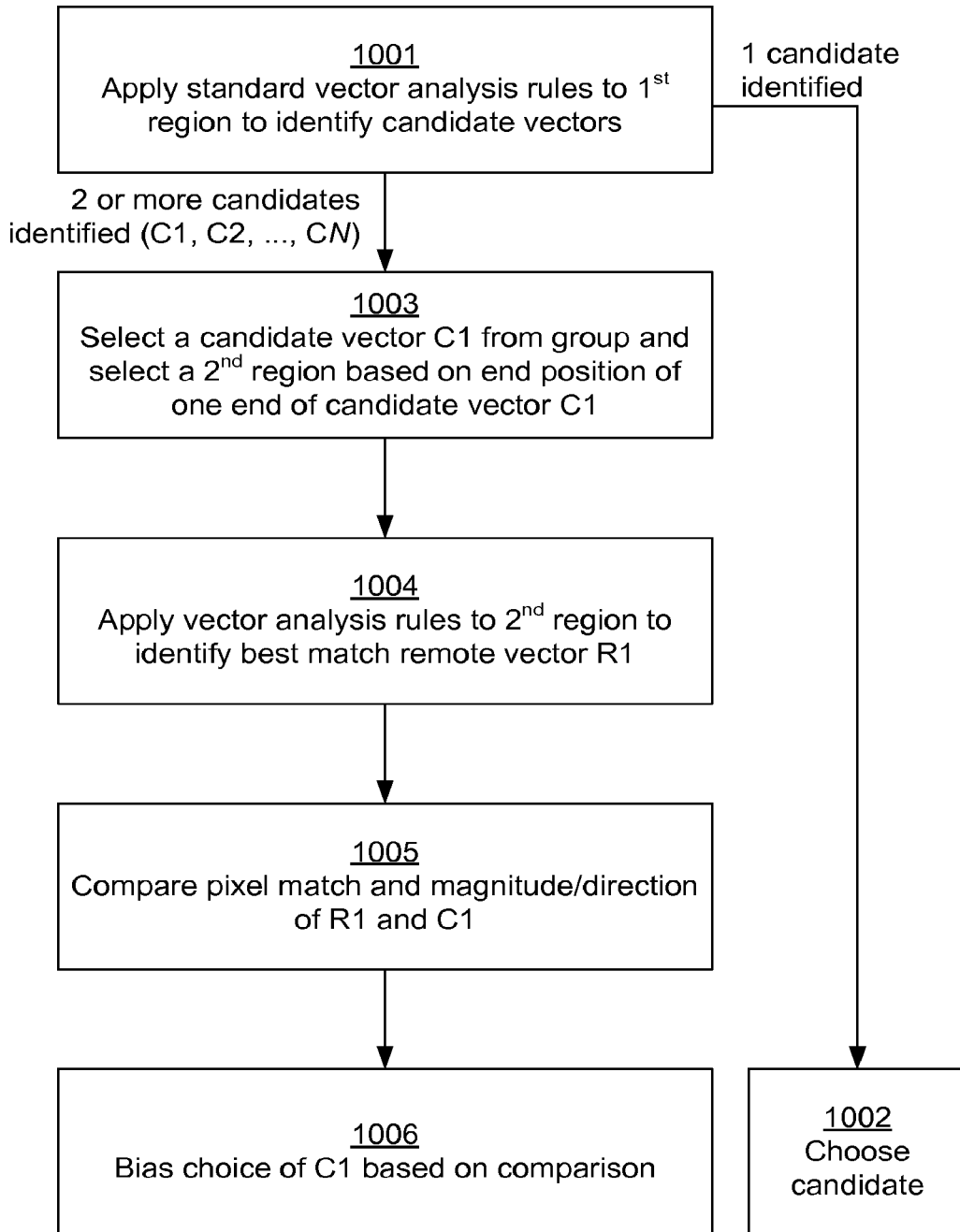
FIG. 10 shows an example of a method for determining when to bias towards or away from a candidate vector.

FIG. 10 outlines an example of a method that can be applied to bias the selection of candidate vectors in situations such as that described in relation to FIGS. 8 and 9. Firstly, at step 1001, existing double ended vector motion estimation rules are applied to a first region upon which motion estimation is being performed. These motion estimation rules may, for example, apply restrictions to a set of vectors and apply weightings based upon pixel matching or other factors to arrive at a set of candidate vectors that represent the possible true motion vectors of an interpolated frame. If only a single candidate vector is identified, as may be the case in example A), B) and C) of FIG. 8, then this candidate vector is chosen as the double ended motion vector for the block of interest as indicated at step 1002.

Figure 4:
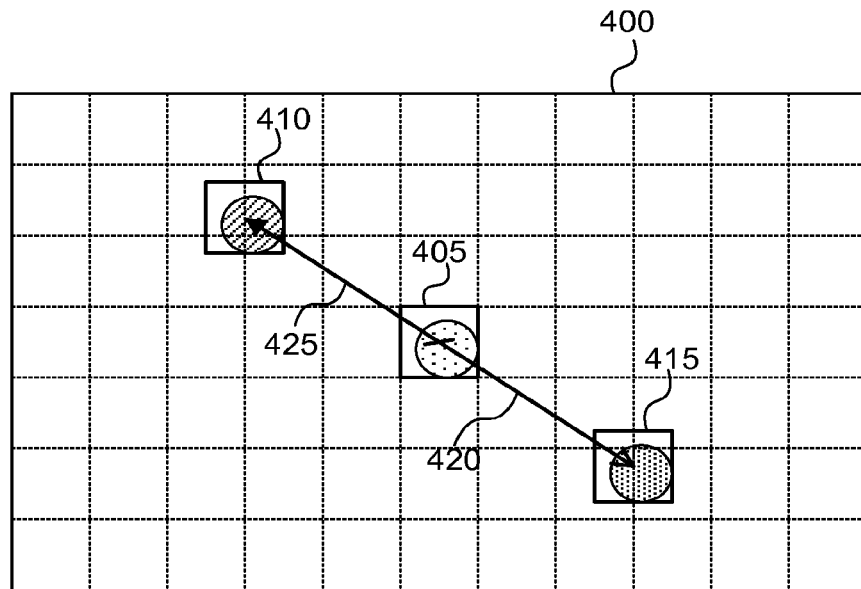
FIG. 4 shows an example of a double ended vector for motion estimation.
Figure 5:
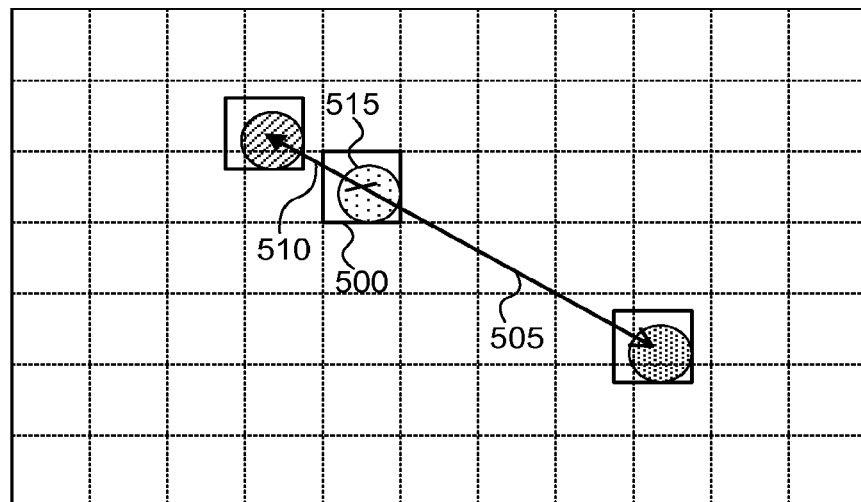
FIG. 5 shows an example of double ended vectors having varying interpolation phases.

However, if two or more candidate vectors, C1, C2, . . . , CN, etc, are identified by the rules, then an artefact risk occurs and the best vector needs to be determined from the set of vectors. At step 1003 one of the candidate vectors, e.g., vector C1, is selected for investigation from the group. The selected candidate vector is then used to select a second region based upon the position to which one end of this vector points. In FIG. 8, the example vector 840 is shown as pointing to particular grid regions 820 and 830. It will be appreciated that, as shown in FIG. 4, a double ended vector may not necessarily point to an area that aligns precisely with the grid. Embodiments may therefore rely on selecting a particular segment of the grid of the interpolated frame based upon which segment of the grid the vector is pointing to, rather than selecting an area centred on the end of the vector.

At step 1004, the existing vector analysis rules are applied to the second region to identify the best matching remote vector, R1, which represents the best match to the vector analysis rules for that region in the interpolated frame. In fact, the vector analysis rules may have already been applied to the second region, as motion estimation involves applying the motion estimation rules to each grid segment in turn. The steps being described for deciding between candidate vectors may be applied after an initial pass has been made to identify candidate motion vectors for each grid segment. In either case, the results of motion estimation for the second region are used to produce a motion vector for analysis.

The identified remote vector R1 is analysed by comparing its magnitude and/or direction with that of the selected candidate vector C1 at step 1005. Also, the pixel match property, or SAD value, is used. If the remote vector R1 is similar enough to the selected candidate vector C1 and the pixel match of the remote vector R1 is good enough, then at step 1006 either no bias is applied to the candidate vector C1, or a bias towards the candidate vector C1 is applied (possibly by penalising the other candidates in the candidate set). If the remote vector R1 is similar enough to the selected candidate vector C1, but the pixel match of the remote vector 1 is poor, then no bias may be applied to the candidate vector, or a bias may be applied away from the candidate vector. If the remote vector R1 is not similar enough to the selected candidate vector C1 then a bias may be applied away from the candidate vector.

Values of scores may be associated with each candidate vector, these values being assigned, for example, by the application of existing motion estimation rules. The bias may be achieved by applying a weighting to the value associated with a given candidate vector. The bias can be applied to this score to raise or lower it as appropriate such that in a set of equally scored, or similarly scored, candidate vectors the score of one particular candidate vector is raised above or below the others and selected as the vector associated with the region of the interpolated frame being analysed.

In relation to pixel match for remote vector R1, a bias or weighting away from a candidate vector may be applied when, for example, the SAD or MSD value of the remote vector is above a predetermined threshold value. The weighting may be a predetermined amount such as a fixed scale factor and/or a fixed amount added or subtracted from the overall score of the candidate vector. Alternatively, the weighting may be variable and dependent upon the pixel match value.

In relation to the similarity of the remote vector R1 to the selected candidate vector C1, this similarity may be determined in different ways. The aim is to determine whether the two vectors are substantially the same vectors, and to apply a bias away from the candidate vector under investigation if they are not. If the direction and/or magnitude of the remote vector differs from the selected candidate vector C1 by less than a predetermined amount then they may be considered to be similar, or substantially the same. The predetermined amount may, for example, relate to a 1% deviation in magnitude and/or direction. Similarly, if the direction and/or magnitude differ by more than a predetermined amount then the two vectors may be considered to be different and a bias applied. As with the pixel match property, the bias may manifest in a fixed weighting, or alternatively may be a variable weighting dependent upon the amount that the remote vector differs from the candidate vector, with the weighting away from the selected candidate vector increasing as the difference in magnitude and/or direction increases.

The example of FIG. 10 describes the use of only a single remote area to weight or bias the choice of a particular candidate vector being investigated. The process provides enough information to avoid some artefacts (e.g. flickers) but accuracy can be improved further by using a second remote area.

Figure 11:
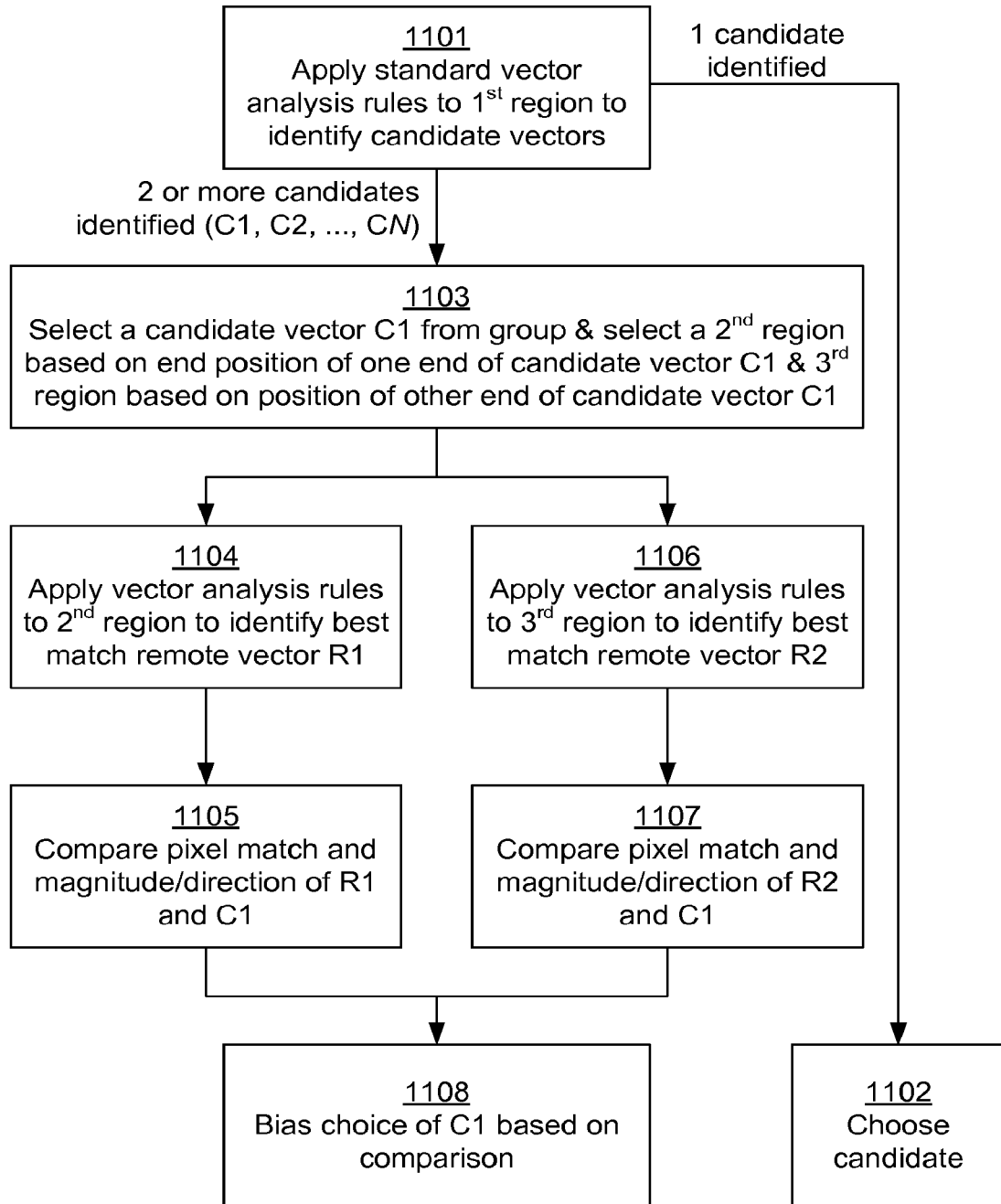
FIG. 11 shows an alternative example of a method according to FIG. 10.

FIG. 11 outlines an example of a further method that can be applied to bias the choice of candidate vectors. A number of steps in FIG. 11 are similar to those of FIG. 10, and are labelled with analogous step numerals; description of these similar steps will not be repeated. The primary difference between the methods of FIGS. 10 and 11 is the use of remote vectors from two different remote regions.

At step 1103, a candidate vector C1 is selected as for step 1003 in FIG. 10. However, a second region and a third region are selected based upon the positions of each respective end of bi-directional motion vector C1. Each of the second and third regions may be selected in the same manner as described above. Steps 1004 and 1005 are then carried out for both the second and third regions independently as shown in steps 1104 and 1105 and 1106 and 1107. Steps 1104 and 1105 may be performed before, after, or at the same time as performing steps 1106 and 1107. Again, the best matching vectors for each of these remote regions may have been calculated previously and stored in a memory for later access.

At step 1108, the biasing or weighting towards or away from candidate vector C1 is determined based upon the analysis of the properties of remote vectors R1 and R2.

If both remote vectors R1 and R2 are determined to be the same as, or similar enough to, the selected candidate vector C1 and the pixel match of the remote vectors are sufficient then no bias may be applied, or a bias towards the selected candidate vector may be applied, since the current block or region being investigated is trustworthy and the candidate vector C1 is accurate.

If both remote vectors R1 and R2 are determined to be the same as, or similar enough to, the selected candidate vector C1 but the pixel match of only one of the remote vectors is poor, then no bias may be applied to the candidate vector C1, or a bias, preferably being a small bias, may be applied away from the candidate vector C1. As mentioned above, a poor pixel match may not be sufficient to warrant ignoring a given candidate vector because there are reasons, such as shadows passing in front of objects, as to why poor pixel matches may be obtained that do not necessarily mean that the candidate vector being investigated is not accurate.

If only one of the vectors R1 and R2 differ from candidate vector C1, then a bias may be applied away from the candidate vector, since this may indicate that the selected candidate vector is not an accurate reflection of the movement of pixels through the region of interest. The bias applied in this instance may be greater than the bias that would be applied if only the pixel match of one of the remote vectors were poor or insufficient.

If both remote vectors R1 and R2 are either not similar enough to the selected candidate vector C1, or have a poor pixel match then a bias may be applied away from the candidate vector. In this instance, the bias may be comparatively large, for example, being larger than the bias applied if only one remote vector were different to the candidate vector, or if only one remote vector had a poor pixel match value.

As mentioned above, the biases applied to the candidate vector being investigated are used to determine which candidate vector from the set of candidate vectors is selected as the best representation of the motion vector for the selected block. The processes of FIGS. 10 and 11 may be repeated for the other candidate vectors identified at steps 1001 or 1101. In this way, appropriate biases are applied to the candidate vectors based upon information determined by looking at the properties of related remote vectors.

Where, however, the set of candidate vectors includes at least one zero or small vector (such that its endpoints fall within the current block) and one or more larger, non-zero vector whose endpoints fall outside the current block, it may be sufficient to apply biases only to the larger non-zero vectors, since the zero or small vector will identify a remote location equal to the current location and therefore is known to be self-consistent.

As has been described above, embodiments find use where two remote regions are analysed, as detailed in relation to FIG. 11, or where only a single remote region is analysed, as detailed in relation to FIG. 10. This means that benefit can be derived without necessarily requiring two remote regions to be analysed. As has also been described above, it is possible that the remote vectors associated with remote regions, such as vectors R1 and R2, have already been calculated during the performance of the traditional motion estimation techniques. In particular, where a grid is used on the interpolated frame, as shown in FIGS. 1 to 9, motion estimation may be performed for each grid block in sequence, until all blocks of the grid have been treated, with the best candidate motion vector being associated with each grid block according to the known motion estimation rules. An example of this sort of scanning may be a raster style scan, in which grid blocks are analysed one at a time by rows until all rows in the grid have been treated.

When such scanning is being performed, it is likely that eventually a grid block will be reached for which the motion estimation rules identify two or more candidate vectors. In the example of FIG. 8, this may represent a problem if two remote regions are to be analysed because the scanning, which may for example proceed from top left to bottom right in rows, may not yet have reached the region 820 to which the non-zero candidate vector 840 points. Therefore, in such scanning arrangements, the method used to bias towards or away from a candidate vector may only utilise the regions or blocks to which that candidate vector points, and that have already been scanned in accordance with the scanning regime. Sometimes the vector may point to two grid blocks, both of which have been scanned, in which case the analysis can proceed on the basis of two remote vectors associated with respective remote regions. Where the candidate vector only points to one block that has already been scanned, the method can proceed on the basis of using only one remote vector associated with a remote region.

In another example, if the vector points to a remote block for which motion vectors have not yet been calculated, then the remote vector can be calculated on-demand, as needed for performing the analysis. In a further example, motion vectors from a previous frame can be used for a remote block, if the remote vector for the current frame is not available. In other examples, single ended vectors may be available for the remote blocks, in which case these can be used for the analysis, and converted to double ended vectors if needed. Any suitable combination of these approaches can also be used. However, it is worth noting that, in general, there will usually be at least one end of the double ended vector that points to a block that has already been scanned/processed, and hence some remote vector information will generally be available without further processing.

For embodiments that utilise two remote regions it is possible that, rather than comparing the vector properties of magnitude and/or direction with the selected candidate vector, the comparison could be made between each of the remote vectors. If the remote vectors do not match, then this still provides an indication that at least one of the vectors does not conform to the candidate vector being investigated. Therefore, a biasing can be applied away from the selected candidate vector as appropriate.

Figure 12:
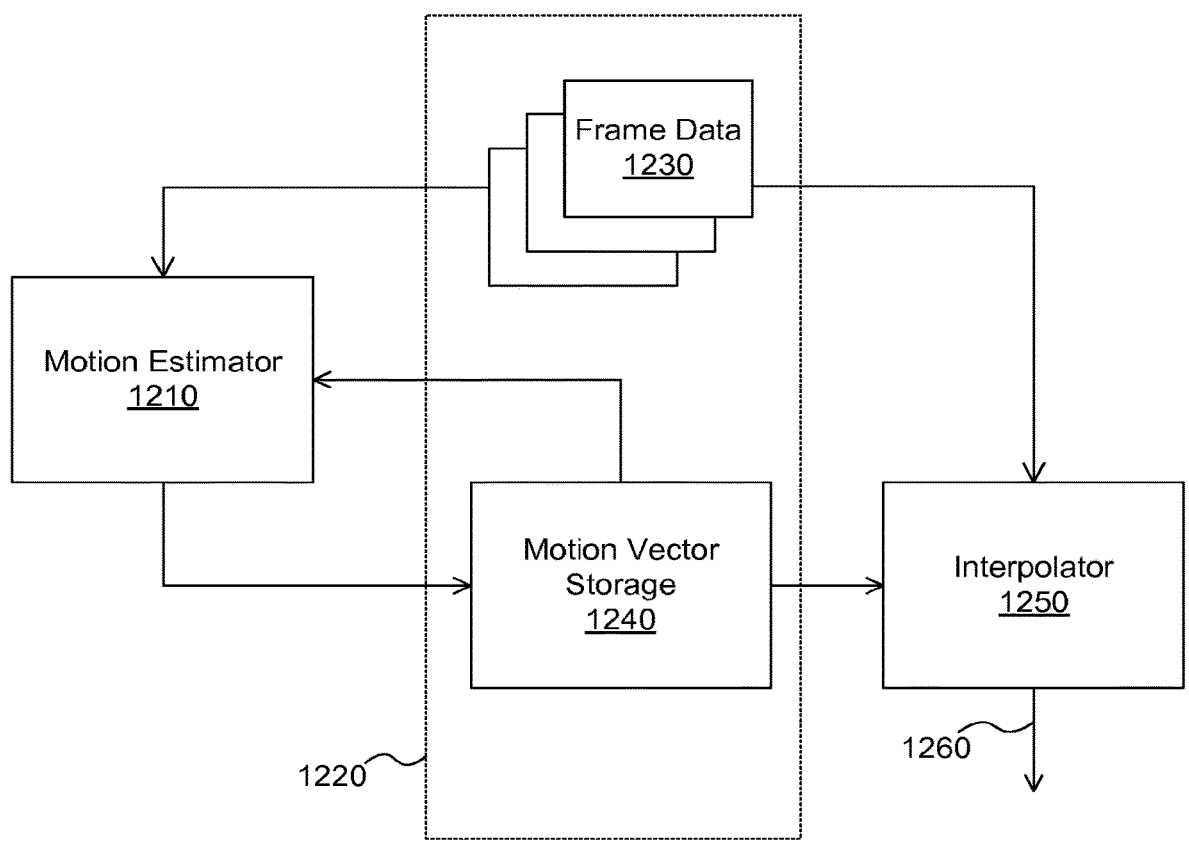
FIG. 12 shows an example frame rate interpolation system using the motion estimation technique.

Several types of video processing system may benefit from the use of the motion vector selection technique described above. One example is a motion compensated frame rate converter/interpolator shown, simplified, in the block diagram of FIG. 12. The motion compensated frame rate converter comprises a motion estimator 1210, which utilises the vector selection techniques outlined above. A memory 1220 holds frame data 1230, which is supplied to the motion estimator 1210. The motion estimator 1210 computes motion vectors which, in this example, are stored in motion vector storage 1240 in the memory 1220. As described above, when calculating the motion vector for a block, the motion estimator 1210 may also make use of other motion vectors for the remote blocks, which may also be stored in the motion vector storage 1240 and retrieved by the motion estimator 1210. An interpolator 1250, receives frame data 1230 and the stored motion vector data 1240 from which an interpolated output frame 1260 is derived.

Figure 13:
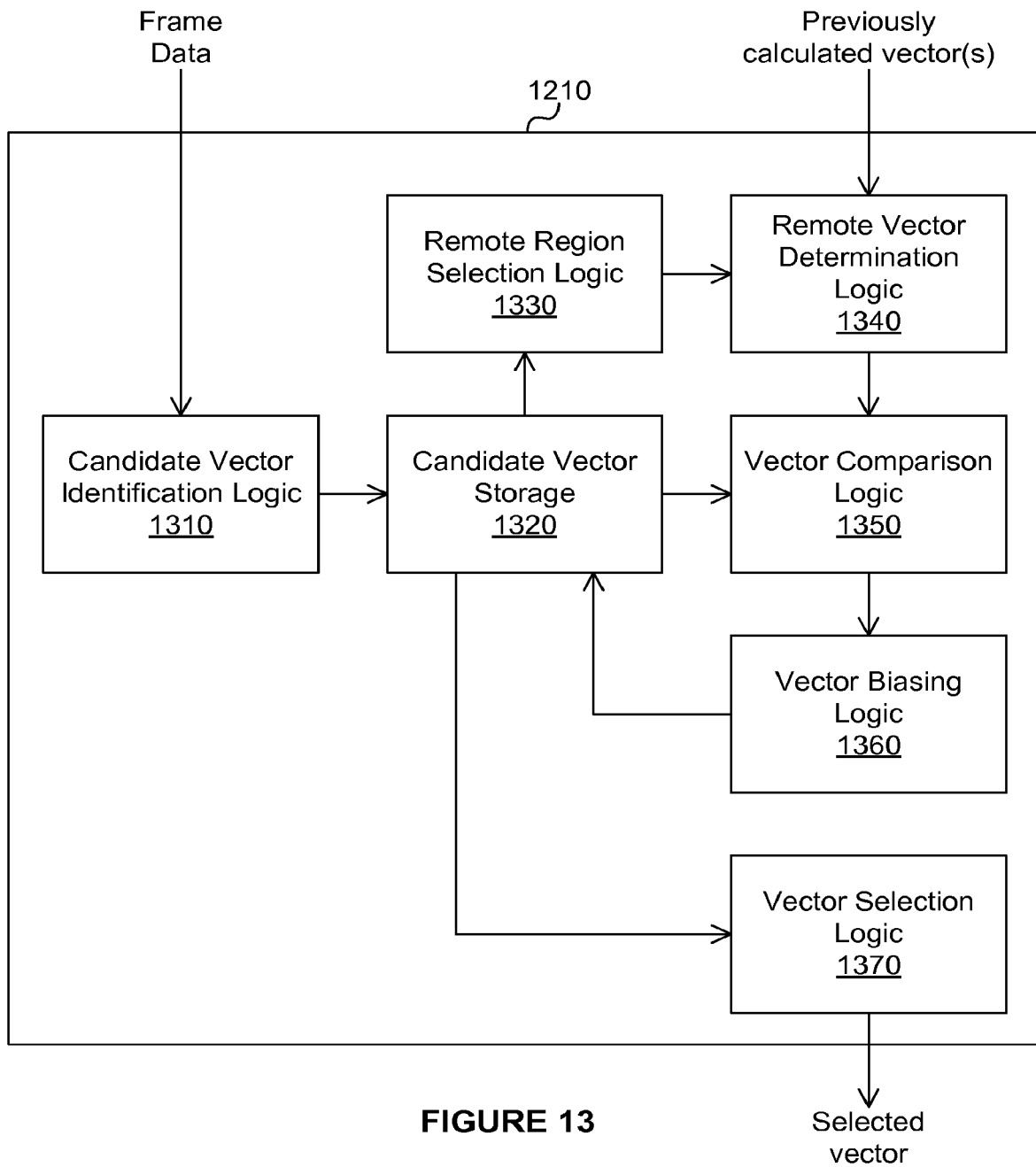
FIG. 13 shows a block diagram of a motion estimator utilising the motion estimation technique.

FIG. 13 illustrates a block diagram of an example motion estimator 1210 implementing the motion vector selection techniques described above. Frame data (such as 1220) is received at the motion estimator 1210, and provided to candidate vector identification logic 1310. The candidate vector identification logic 1310 generates the candidate motion vectors for a given block of a frame. The candidate vector identification logic 1310 may use standard motion vector analysis rules. The output from the candidate vector identification logic 1310 is a set of candidate motion vectors, which are stored in candidate vector storage 1320. The candidate vector storage 1320 can be in the form of a memory or any other suitable type of storage device.

If there is more than one candidate motion vector, remote region selection logic 1330 reads one of the candidate motion vectors for a block from the candidate vector storage 1320, and calculates one or more remote blocks that are pointed to by that candidate motion vector. It may perform this function for each candidate motion vector (although this may be performed in parallel in some examples). The remote region selection logic 1330 may determine the remote block or blocks aligned to the grid that is closest to the endpoint(s) of the candidate motion vector.

The location of the at least one remote block is provided to remote vector determination logic 1340. The remote vector determination logic 1340 determines the remote vector at the or each remote block. The remote vector determination logic 1340 can retrieve previously calculated motion vectors for the remote block(s) (e.g. from the motion vector storage 1230). The previously calculated motion vectors for the remote block(s) may be motion vectors that have already been calculated for this frame, motion vectors from a previous frame, single ended motion vectors, or any combination thereof. The remote vector determination logic 1340 may also trigger the on-demand calculation of the motion vector for the remote block, if it is not available.

The remote vectors identified by the remote vector determination logic 1340 are provided to vector comparison logic 1350. The vector comparison logic 1350 also reads the candidate vector(s) under consideration from the candidate vector storage 1320. The vector comparison logic 1350 analyses the remote vectors, for example by determining the pixel match values for the or each remote vector and by computing a difference metric based on the similarity of the magnitude and/or direction of the remote vector to the candidate vector. The results from the vector comparison logic 1350 are provided to vector biasing logic 1360, which calculates biasing values for a candidate vector in accordance with the comparisons, and writes these biasing values to the candidate vector storage 1320 in association with the corresponding candidate vector. Vector selection logic 1370 selects one of the candidate motion vectors for the block from biased candidate vectors, and outputs this as the result of the motion estimator.

The above processing may be performed sequentially for each block, and each candidate vector associated with that block, or all or a portion of the processing may be performed in parallel.

Although examples have been described primary in relation to occlusion of objects by a stationary foreground object, it will be appreciated that the occluding object need not be stationary and the method may not, necessarily, be used to select between a non-zero and a zero vector. If the occluding object is itself moving, then the method can be employed to select between different non-zero candidate vectors.

The examples have been described in relation to motion estimation using double ended vectors. In examples, the motion estimation techniques described herein may be applied to a method for interpolating a frame of video data from two or more adjacent frames of video data by repeatedly applying these methods to each grid segment of the interpolated frame as appropriate, resulting in a complete interpolated intermediate frame.

Embodiments may be applied to content encoders, motion trackers, and frame rate converters, for example, and to any other systems that make use of motion estimation techniques using bi-directional double ended vectors.

In various video coding standards, for example, H.264, "B frames" are bi-directionally predicted. Each encoded block may choose to use one or two reference frames. Where one reference frame is used the encoding is similar to that used in a uni-directionally predicted, "P", frame. Where two reference frames are used, the prediction may be an average of reference pixels taken from one frame preceding the encoded frame, and from one frame following it. The vectors identifying the reference pixel areas in the two reference frames are not necessarily equal in length or co-linear, and motion estimation attempts to match pixel data in each of the reference frames with the pixel data in the block being encoded. As such, B frame encoding differs significantly from the double ended vector method described here, and should not be confused with it.

Generally, any of the functions, methods, techniques or components described above can be implemented in modules using software, firmware, hardware (e.g., fixed logic circuitry), or any combination of these implementations. The term "logic" is used herein to generally represent software, firmware, hardware, or any combination thereof.

In the case of a software implementation, the logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. For example, a non-transitory computer readable storage medium may have stored thereon computer readable instructions that, when processed at a computer system for generating a manifestation of an integrated circuit, cause the computer system to generate a manifestation of a motion estimator as described in the examples herein. The manifestation of the motion estimator could be the motion estimator itself, or a representation of the motion estimator (e.g. a mask) which can be used to generate the motion estimator.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples. The steps of the methods described herein may be carried out in any suitable order, or simultaneously where appropriate. Aspects of any of the examples described above may be combined with aspects of any of the other examples described to form further examples without losing the effect sought.

What is claimed is:

1. A motion estimation method comprising:
selecting a region of an interpolated frame based on a position of one end of a candidate motion vector;
identifying a remote motion vector associated with the region of the interpolated frame; and
setting a selection value for the candidate motion vector based on the remote motion vector.

2. The method according to claim 1, wherein setting the selection value for the candidate motion vector comprises weighting the candidate motion vector based on one or more properties associated with the remote motion vector.

3. The method according to claim 2, wherein the properties associated with the remote motion vector comprise at least one of: the magnitude of the remote motion vector; the direction of the remote motion vector; and a pixel match value relating to the similarity between a set of pixels located at each end of the remote motion vector.

4. The method according to claim 1, wherein setting the selection value comprises comparing one or more properties associated with the remote motion vector with one or more properties associated with the candidate motion vector.

5. The method according to claim 4, wherein the comparing comprises at least one of:
comparing the magnitude of the remote motion vector with the magnitude of the candidate motion vector; and
comparing the direction of the remote motion vector with the direction of the candidate motion vector.

6. The method according to claim 4, wherein setting the selection value further comprises at least one of:
weighting the candidate motion vector to be more likely to be selected as an output vector if the one or more properties associated with the remote motion vector are within a predefined threshold of the one or more properties associated with the candidate motion vector; and
weighting the candidate motion vector to be less likely to be selected as an output vector if the one or more properties associated with the remote motion vector differ from the one or more properties associated with the candidate motion vector by more than a predefined threshold.

7. The method according to claim 1, wherein setting the selection value comprises comparing one or more properties associated with the remote motion vector against a predetermined value.

8. The method according to claim 7, wherein the comparing comprises calculating a pixel match value relating to the similarity between a set of pixels located at each end of the remote motion vector, and comparing the pixel match value against the predetermined value.

9. The method according to claim 8, wherein setting the selection value further comprises at least one of:
weighting the candidate motion vector to be less likely to be selected as an output vector if comparing the pixel match value to the predetermined value indicates that the pixels located at each end of the remote motion vector are dissimilar; and
weighting the candidate motion vector to be more likely to be selected as an output vector if comparing the pixel match value to the predetermined value indicates that the pixels located at each end of the remote motion vector are similar.

10. The method according to claim 1 further comprising:
selecting a further region of the interpolated frame based on a position of another end of the candidate motion vector;
identifying a further remote motion vector associated with the further region of the interpolated frame; and
setting the selection value for the candidate motion vector based on the further remote motion vector.

11. The method according to claim 1, further comprising choosing the candidate motion vector to be an output motion vector, and outputting the output motion vector.

12. A motion estimator, comprising:
region selection logic arranged to select a region of an interpolated frame based on a position of one end of a candidate motion vector;
remote vector determination logic arranged to identify a remote motion vector associated with the region of the interpolated frame; and
vector biasing logic arranged to set the selection value for the candidate motion vector based on the remote motion vector.

13. The motion estimator according to claim 12, wherein vector biasing logic is arranged to set the selection value by weighting the candidate motion vector based on one or more properties associated with the remote motion vector.

14. The motion estimator according to claim 13, wherein the properties associated with the remote motion vector comprise at least one of: the magnitude of the remote motion vector; the direction of the remote motion vector; and a pixel match value relating to the similarity between a set of pixels located at each end of the remote motion vector.

15. The motion estimator according to claim 12, further comprising vector comparison logic arranged to:
compare one or more properties associated with the remote motion vector with at least one of: one or more properties associated with the candidate motion vector; and a predetermined value, and
provide a result of the comparison to the vector biasing logic.

16. The motion estimator according to claim 12, wherein:
the region selection logic is further arranged to select a further region of the interpolated frame based on a position of another end of the candidate motion vector;
the remote vector determination logic is further arranged to identify a further remote motion vector for the further region of the interpolated frame; and
the vector biasing logic is further arranged to set the selection value for the candidate motion vector based on the further remote motion vector.

17. The motion estimator according to claim 12, wherein the interpolated frame is divided into a grid of blocks, and whereby the region is selected as the grid block in which the end of the candidate motion vector is located.

18. The motion estimator according to claim 17, wherein motion vectors are stored in a memory for each grid block of the interpolated frame, and the remote vector determination logic is arranged to identify the remote motion vector for the region by reading the motion vector associated with the grid block corresponding to the region from the memory.

19. The motion estimator according to claim 12, wherein the candidate motion vector and the remote motion vector is a double-ended motion vector.

20. A non-transitory computer readable storage medium having stored thereon processor executable instructions that when executed cause at least one processor to:
select a region of an interpolated frame based on a position of one end of a candidate motion vector;
identify a remote motion vector associated with the region of the interpolated frame; and
set the selection value for the candidate motion vector based on the remote motion vector.

* * * * *